United States Patent
Faruque et al.

(10) Patent No.: US 10,682,972 B2
(45) Date of Patent: Jun. 16, 2020

(54) DEPLOYABLE FLEXIBLE PANEL FOR VEHICLE DOOR OPENING

(71) Applicant: Ford Global Technologies, LLC, Dearborn, MI (US)

(72) Inventors: Mohammad Omar Faruque, Ann Arbor, MI (US); S. M. Iskander Farooq, Novi, MI (US); Dean M. Jaradi, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 36 days.

(21) Appl. No.: 15/995,856

(22) Filed: Jun. 1, 2018

(65) Prior Publication Data

US 2019/0366967 A1 Dec. 5, 2019

(51) Int. Cl.
| | |
|---|---|
| *B60R 21/08* | (2006.01) |
| *B60R 21/232* | (2011.01) |
| *B60R 21/231* | (2011.01) |
| *B60R 21/02* | (2006.01) |

(52) U.S. Cl.
CPC ............ *B60R 21/08* (2013.01); *B60R 21/232* (2013.01); *B60R 21/23138* (2013.01); *B60R 2021/028* (2013.01)

(58) Field of Classification Search
CPC . B60R 21/08; B60R 21/23138; B60R 21/232; B60R 2021/028
See application file for complete search history.

(56) References Cited

U.S. PATENT DOCUMENTS

| | | | |
|---|---|---|---|
| 5,588,672 A | 12/1996 | Karlow et al. | |
| 5,660,414 A * | 8/1997 | Karlow | B60R 21/08 180/274 |
| 7,125,069 B2 * | 10/2006 | Cacucci | B60R 21/02 296/190.03 |
| 7,735,863 B2 | 6/2010 | Walston et al. | |
| 2001/0033073 A1 | 10/2001 | Hammond et al. | |
| 2005/0035669 A1 * | 2/2005 | Bares | E02F 9/24 307/326 |
| 2006/0191204 A1 * | 8/2006 | Herwig | B60J 5/06 49/28 |

FOREIGN PATENT DOCUMENTS

| | | |
|---|---|---|
| DE | 10335800 A1 | 3/2005 |
| DE | 102005038265 A1 | 2/2007 |

* cited by examiner

*Primary Examiner* — Paul N Dickson
*Assistant Examiner* — Kurtis Nielson
(74) *Attorney, Agent, or Firm* — Frank A. MacKenzie; Bejin Bieneman PLC

(57) ABSTRACT

A vehicle includes a door opening shaped to receive a removable door, a flexible panel deployable to a position extending across the door opening, and a controller programmed to deploy the flexible panel in response to an impact based on an absence of the removable door from the door opening. The vehicle may include a track elongated along the door opening, and the flexible panel may be deployable along the track.

17 Claims, 8 Drawing Sheets

DEPLOYABLE FLEXIBLE PANEL FOR VEHICLE DOOR OPENING

BACKGROUND

Vehicles typically include doors. The doors can be opened to allow occupants to enter and exit the vehicle. When closed, the doors, perhaps in conjunction with seatbelts, airbags, etc., can prevent occupants from exiting the vehicle in an impact. During an impact, the momentum of the vehicle may suddenly change relative to the momentum of the occupants; the doors may prevent the momentum of the occupants from carrying the occupants out of the vehicle by blocking a path for the occupants to move. Moreover, for vehicles with side curtain airbags, the doors provide a reaction surface for the airbags.

DETAILED DESCRIPTION

Figure 1:
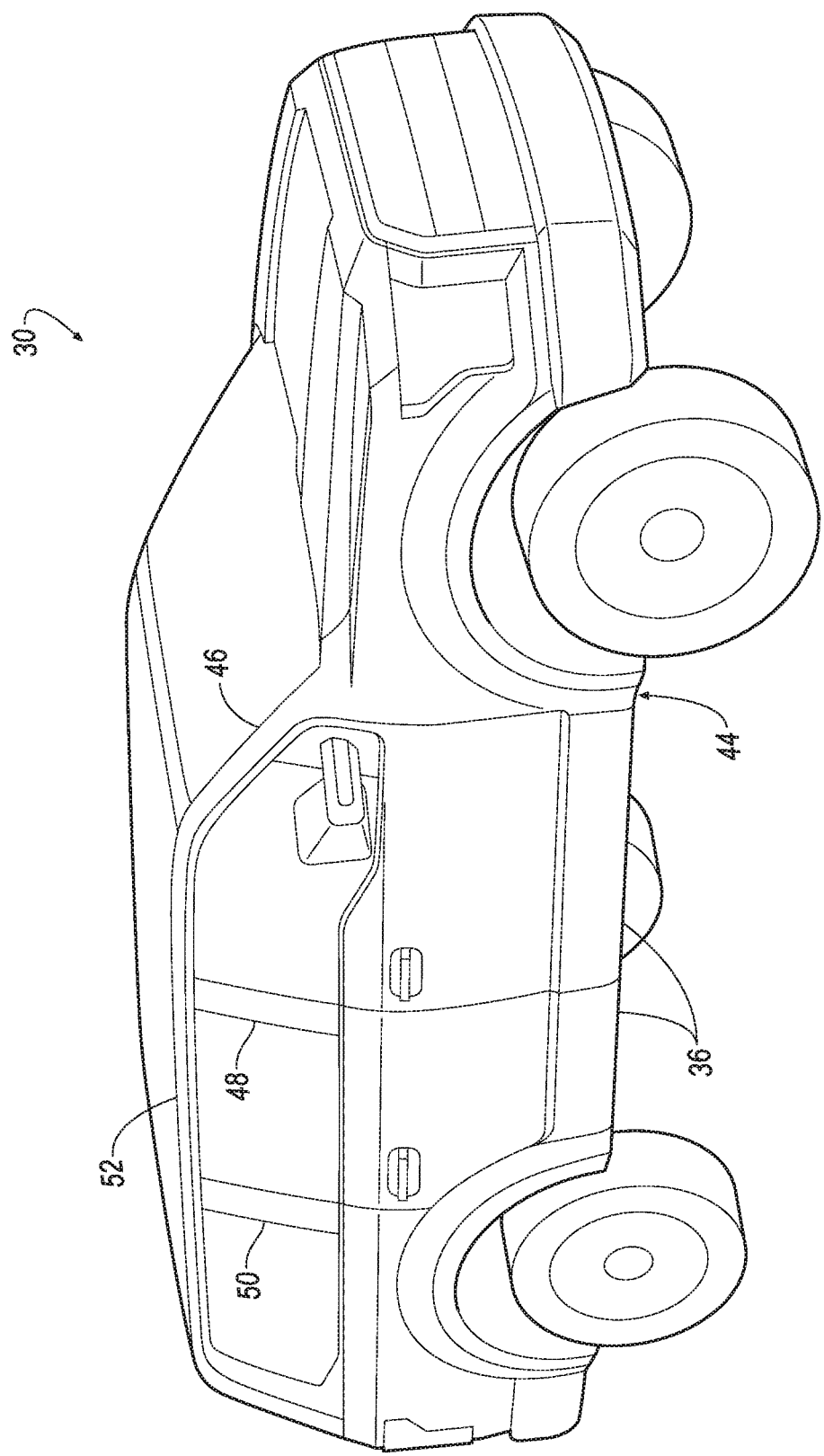
FIG. 1 is a perspective view of an example vehicle.

A vehicle includes a door opening designed to receive a removable door, a flexible panel deployable to a position extending across the door opening, and a controller programmed to deploy the flexible panel in response to an impact based on an absence of the removable door from the door opening.

The flexible panel may be deployable to a position extending across at least half an area circumscribed by the door opening.

The flexible panel may include an uninflatable panel.

The flexible panel may include a side curtain airbag. The flexible panel may include an uninflatable panel attached to the side curtain airbag.

The vehicle may further include a track elongated along the door opening, and the flexible panel may be deployable along the track. The vehicle may further include a pyrotechnic actuator attached to the flexible panel, disposed in the track, and communicatively coupled to the controller. The pyrotechnic actuator may be disposed at a first position in the track and may be movable to a second position in the track upon discharging, and the flexible panel may be deployable by the pyrotechnic actuator moving from the first position to the second position. The track may be narrower at the second position of the pyrotechnic actuator than at the first position of the pyrotechnic actuator.

The track may be a first track, the vehicle may further include a second track elongated along the door opening and spaced from the first track, and the flexible panel may be deployable along the second track. The vehicle may further include two pillars on opposing sides of the door opening, and the first track may be elongated along one of the pillars, and the second track may be elongated along the other of the pillars.

The vehicle may further include a B pillar elongated along the door opening, and the track may be disposed on the B pillar.

The flexible panel may include an uninflatable panel, the uninflatable panel may include a plurality of threads, and ends of at least some of the threads may be slidably attached to the track.

The track may extend downwardly from the flexible panel along the door opening.

The vehicle may further include a door sensor configured to detect the presence of the door in the door opening and communicatively coupled to the controller.

The vehicle may further include an object sensor positioned to detect the presence of an object between two points on the door opening and communicatively coupled to the controller, and the controller may be further programmed to prevent deployment of the flexible panel in response to the object sensor detecting an object.

With reference to the Figures, a vehicle 30 includes at least one door opening 32, 34 shaped to receive one of a plurality of removable doors 36, a flexible panel 38 deployable to a position extending across the door opening 32, 34, and a controller 40 programmed to deploy the flexible panel 38 in response to an impact based on an absence of the removable door 36 from the door opening 32, 34.

The flexible panel 38 can prevent occupants from exiting the vehicle 30 during an impact, while also allowing the vehicle 30 to include removable doors 36. The flexible panels 38 can mostly or partially cover the door openings 32, 34 during a vehicle impact when the vehicle 30 is being operated with the removable doors 36 removed, blocking occupants from exiting the vehicle 30 through the door opening 32, 34 during the vehicle impact. The design of the vehicle 30 is easily adaptable across different frame shapes. The vehicle 30 may thus prevent injuries while allowing greater design freedom.

In some examples, the flexible panel 38 may include an uninflatable panel 72 and a side curtain airbag 42. In such examples, flexible panel 38 can be operational when the vehicle is operated both with and without the removable doors. When the vehicle is operated with the removable doors 36, the side curtain airbag 42 is operational along a window opening of the removeable door 36 during a vehicle impact. When the vehicle is operated with the removable doors 36 removed from the door openings 32, 34, the flexible panel 38, in addition to the operation of the side curtain airbag 42, extends below the side curtain airbag 42 along the area of the door opening 32, 34 otherwise occupied by the removeable door 36. The flexible panels 38 can provide a reaction surface or an anchor for the side curtain airbags 42, cushioning the occupants during an impact.

With reference to FIG. 1, the vehicle 30 includes a body 44. The vehicle 30 may be of a unibody construction, in which a frame and the body 44 of the vehicle 30 are a single component. The vehicle 30 may, alternatively, be of a body-on-frame construction, in which the frame supports the body 44 that is a separate component from the frame. The frame and body 44 may be formed of any suitable material, for example, steel, aluminum, etc.

The body 44 of the vehicle 30 may include A pillars 46, B pillars 48, C pillars 50, and roof rails 52. The A pillars 46 may extend between a windshield and the removable doors 36. The B pillars 48 may extend between adjacent removable doors 36. The C pillars 50 may extend between the removable doors 36 and a backlite. The body 44 may also include D pillars (not shown) if the vehicle 30 is, e.g., an SUV, crossover, minivan, or station wagon, in which case the C pillars 50 extend between rear removable doors 36 and rear left and right windows, and the D pillars extend between the rear right and left windows and the backlite. The roof rails 52 extend along the windows from the A pillar 46 to the B pillar 48 to the C pillar 50.

The door openings 32, 34 are designed to each receive one of the removable doors 36. For the purposes of this disclosure, "removable" as applied to the removable doors 36, is defined as detachable in a manner using only nonspecialty tools, i.e., tools marketed to consumers rather than automotive repair specialists, and in a manner allowing for reattachment. The door opening 32, 34 and/or the removable door 36 may be designed such that the removable doors 36 are "removable." For example, the door opening 32, 34 and/or the removable door 36 may include hinges that are designed to be disengaged and re-engaged by a consumer, e.g., an owner of the vehicle 30, such that the vehicle 30 may be operated either with or without the removable doors 36 in the door openings. The vehicle 30 is designed to be operated with or without the removable doors 36 in the door openings 32, 34.

Figure 2:
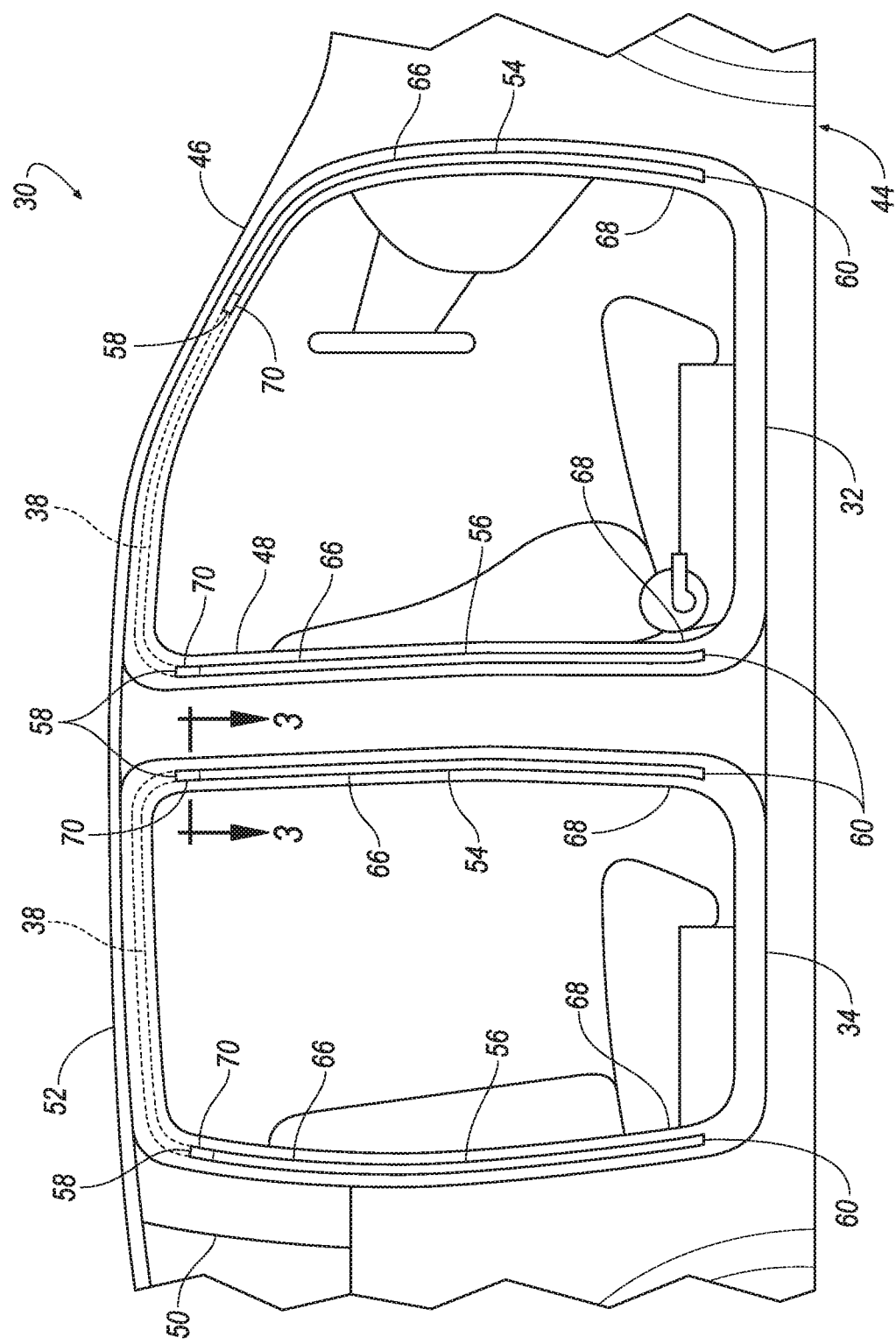
FIG. 2 is a side view of the vehicle of FIG. 1 with removable doors removed and a flexible panel in an undeployed position.

With reference to FIG. 2, the body 44 of the vehicle 30 defines the door openings 32, 34. The door openings 32, 34 may include front-row door openings 32 and second-row door openings 34. The front-row door openings 32, i.e., that are frontmost in the vehicle 30, may be defined by the A pillars 46, the B pillars 48, and the roof rails 52 all elongated along the front-row door openings 32. The second-row door openings 34, i.e., that are immediately rearward of the front-row door openings 32, may be defined by the B pillars 48, the C pillars 50, and the roof rails 52 all elongated along the second-row door openings 34. In other words, the A pillars 46, B pillars 48, C pillars 50, and roof rails 52 may partially outline and constitute the door openings 32, 34.

A plurality of tracks 54, 56 are elongated along the door openings 32, 34. For example, a first track 54 and a second track 56 may be elongated generally vertically along each door opening 32, 34. (The adjectives "first" and "second" are used throughout this document as identifiers and are not intended to signify importance or order.) The first track 54 for the front-row door opening 32 may be elongated along the A pillar 46, i.e., extend lengthwise along the A pillar 46, and the second track 56 for the front-row door opening 32 may be elongated along the B pillar 48, i.e., extend lengthwise along the B pillar 48. The first track 54 for the second-row door opening 34 may be elongated along the B pillar 48, i.e., extend lengthwise along the B pillar 48, and the second track 56 for the second-row door opening 34 may be elongated along the C pillar 50, i.e., extend lengthwise along the C pillar 50. The tracks 54, 56 may each extend from a top end 58 near the respective roof rail 52 to a bottom end 60 near a bottom of the respective door opening 32, 34.

Figure 3:
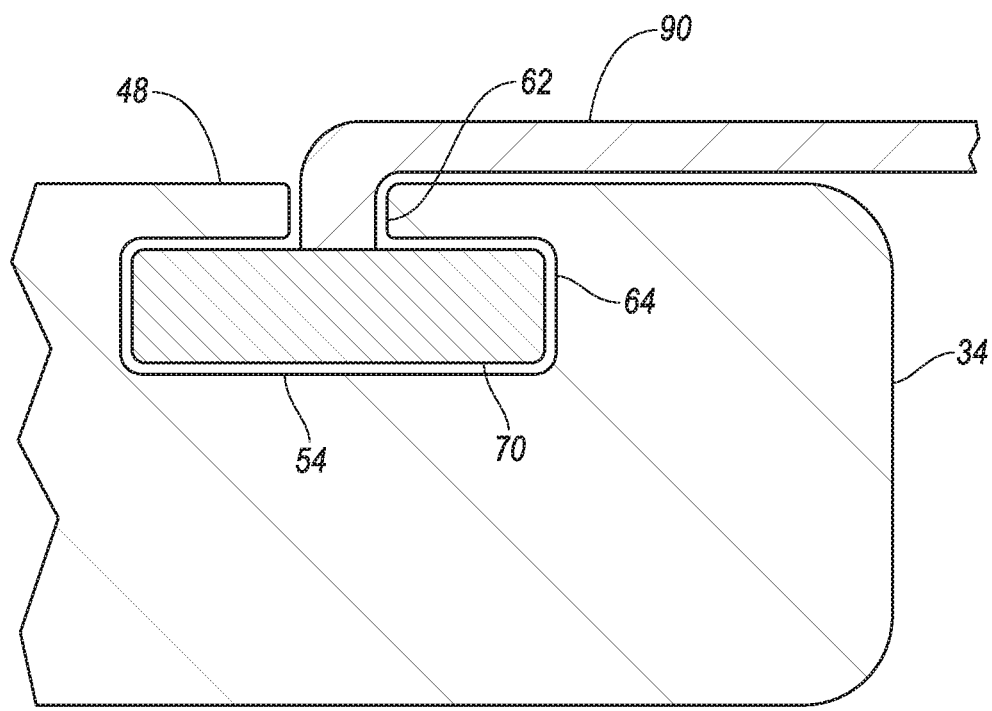
FIG. 3 is a cross-sectional view of a track of a door opening of the vehicle of FIG. 2 including a pyrotechnic actuator.

With reference to FIG. 3, each track 54, 56 has a cross-section including an opening 62 extending from a surface of the corresponding pillar and a passageway 64 connected to the opening 62. The passageways 64 are wider than the openings 62.

Returning to FIG. 2, the tracks 54, 56 each include a full-width section 66 and a narrowed section 68. The track 54, 56 is narrower at the narrowed section 68 than at the full-width section 66. Specifically, the passageway 64 may have a smaller width at the narrowed section 68 than at the full-width section 66. The full-width section 66 may have a constant cross-section, e.g., a constant width of the passageway 64. The full-width section 66 occupies more than half the length, e.g., at least 90% of the length, of each track 54, 56, and the narrowed section 68 may occupy the remaining length of the corresponding track 54, 56.

With reference to FIG. 3, a pyrotechnic actuator 70 may be disposed in each track 54, 56. The pyrotechnic actuator 70 may be sized to slide freely along the full-width section 66 without exiting the track 54, 56, and the pyrotechnic actuator 70 may be sized to wedge itself in the narrowed section 68 such that the pyrotechnic actuator 70 can no longer slide. Each pyrotechnic actuator 70 may be narrower than the corresponding passageway 64 for at least some length of the corresponding track 54, 56, e.g., the full-width section 66, and each pyrotechnic actuator 70 may be wider than the corresponding opening 62. The pyrotechnic actuator 70 is thus able to slide along the full-width section 66 of the track 54, 56 without exiting the track 54, 56. The width of the passageway 64 may be wider than the pyrotechnic actuator 70 along the full-width section 66 and narrower than the pyrotechnic actuator 70 along the narrowed section 68.

Before discharging, each pyrotechnic actuator 70 is disposed at a first position in the corresponding track 54, 56. The pyrotechnic actuator 70 is movable to a second position in the track 54, 56 upon discharging. The first position is in the full-width section 66 of the track 54, 56 and near the top end 58 of the track 54, 56. The second position is at the narrowed section 68 of the track 54, 56 and near the bottom end 60 of the track 54, 56.

The pyrotechnic actuator 70 uses an exothermic chemical reaction to cause itself to move. For example, the pyrotechnic actuator 70 may include charge combustible to produce a gas. The charge may be formed of a solid mixture of substances that, when ignited, react to produce the gas. For example, the charge may be formed of sodium azide ($NaNO_3$), potassium nitrate ($KNO_3$), and silicon dioxide ($SiO_2$), which react to form nitrogen gas ($N_2$). The pyrotechnic actuator 70 may be oriented so that the product of the chemical reaction exits in an opposite direction as the intended motion, providing thrust to propel the pyrotechnic actuator 70 along the track 54, 56 from the first position to the second position.

Figure 4:
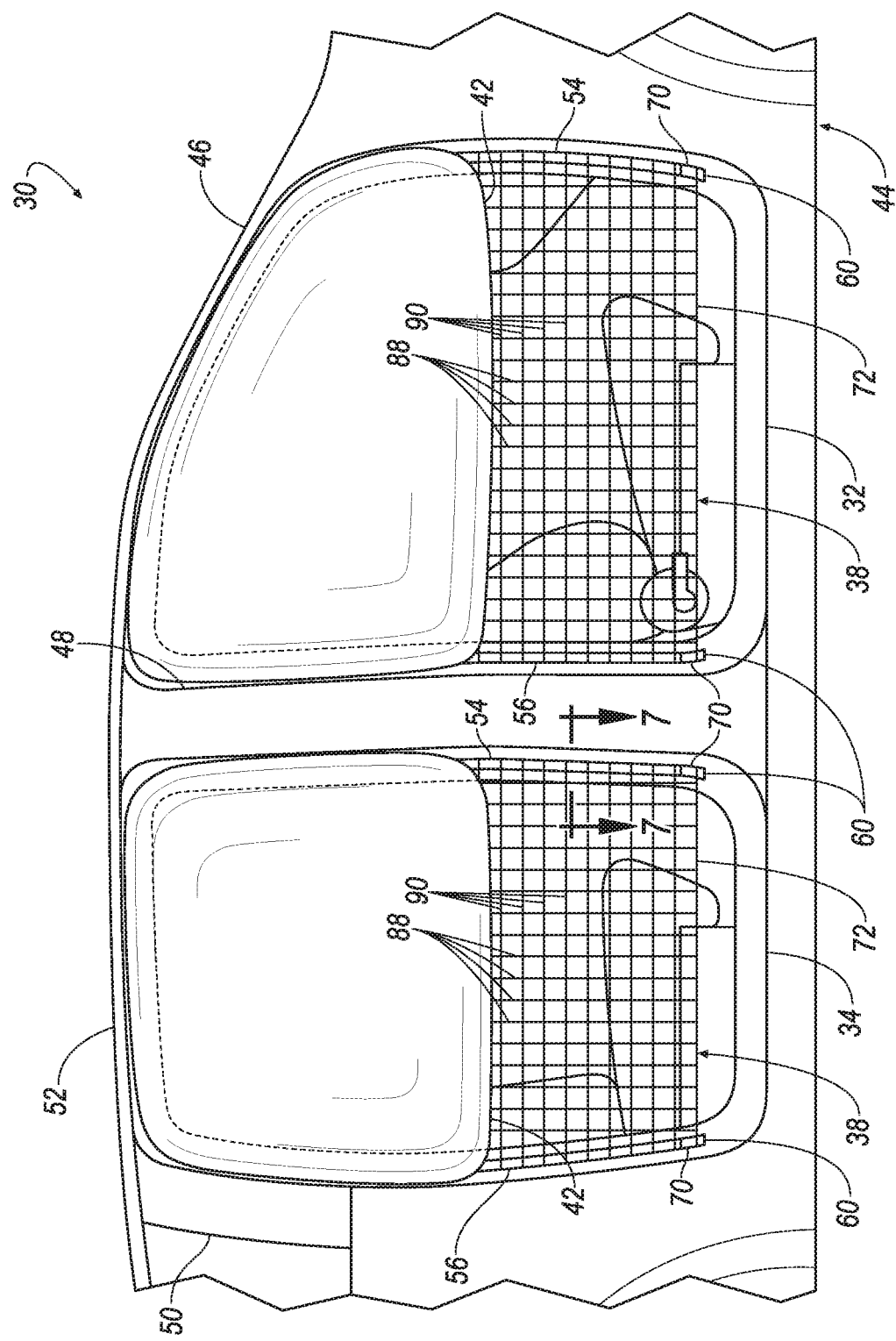
FIG. 4 is a side view of the vehicle of FIG. 2 with the flexible panel in a deployed position having a first arrangement.
Figure 5:
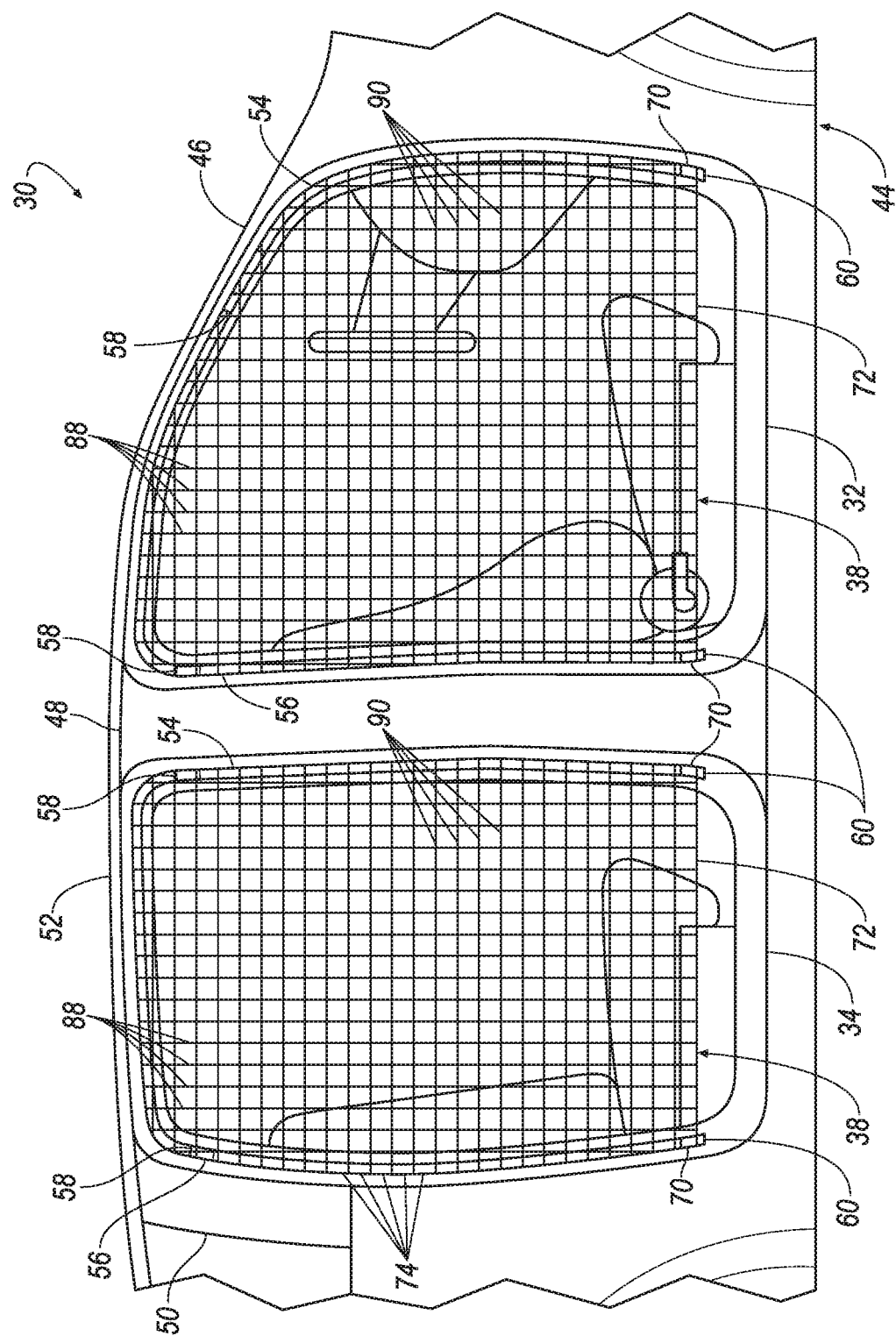
FIG. 5 is a side view of the vehicle of FIG. 2 with the flexible panel in the deployed position having a second arrangement.
Figure 6:
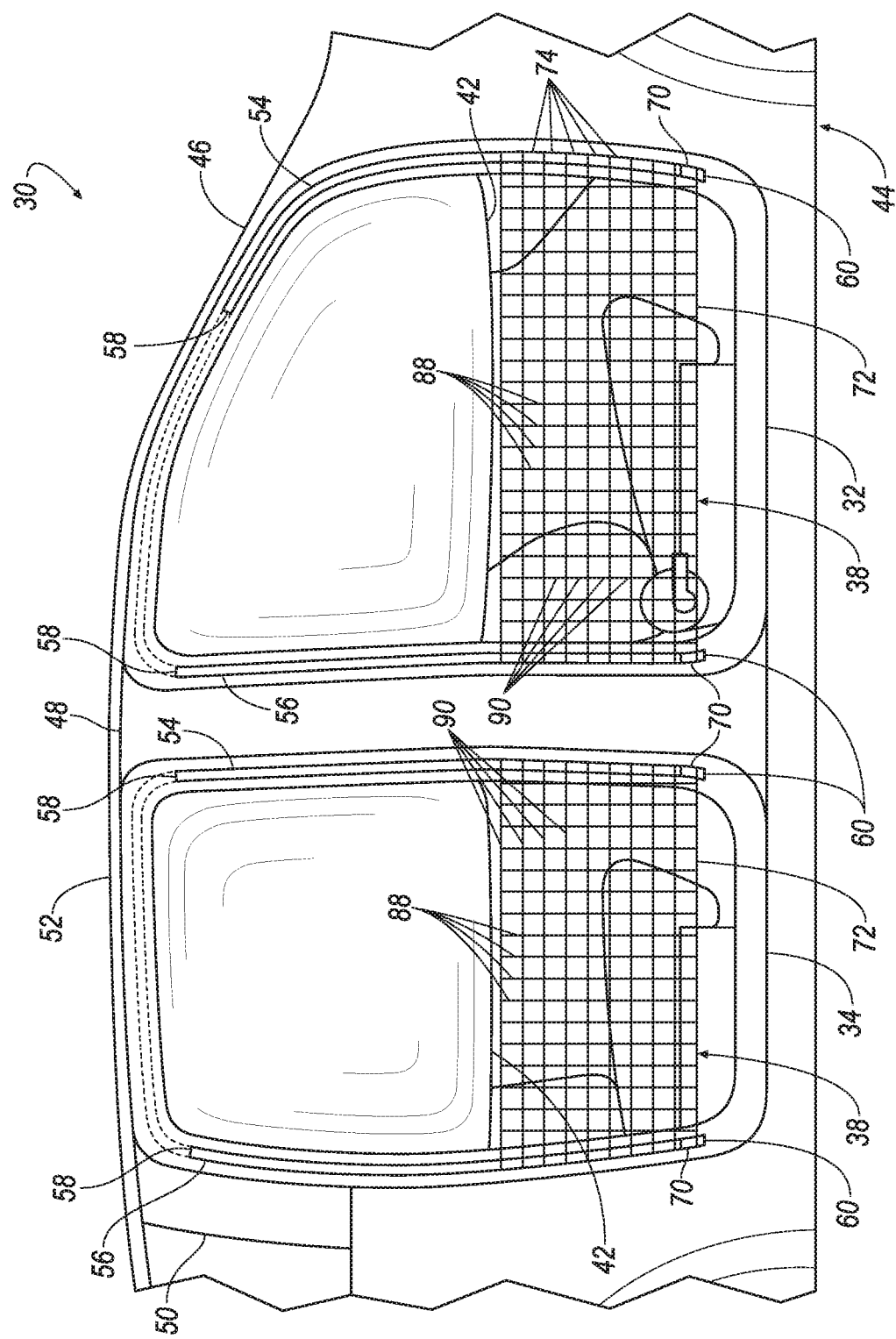
FIG. 6 is a side view of the vehicle of FIG. 2 with the flexible panel in the deployed position having a third arrangement.

With reference to FIGS. 4-6, the flexible panel 38 has a sheetlike shape, i.e., length and width several times greater than thickness. The flexible panel 38 folds or collapses when subject to a compressive force along the length or width rather than maintaining its shape; in other words, the flexible panel 38 is sufficiently flexible to be folded or rolled up. The flexible panel 38 includes one or both of an uninflatable panel 72 and a side curtain airbag 42.

The flexible panel 38 is deployable from an undeployed position to a deployed position. In the undeployed position, the flexible panel 38 may be folded or rolled up, e.g., in the door opening 32, 34 at the roof rail 52, as shown in FIG. 2. In the deployed position, the flexible panel 38 extends across some or most of the corresponding door opening 32, 34. For example, in FIG. 4, the flexible panels 38 each include the uninflatable panel 72 and the side curtain airbag 42 attached to each other, collectively extending across most of the door openings 32, 34. In FIG. 5, the flexible panels 38 each include the uninflatable panel 72 covering most of the door openings 32, 34. In FIG. 6, the flexible panels 38 each include the uninflatable panel 72 covering a portion of the door opening 32, 34, e.g., approximately half the door opening 32, 34, and separate side curtain airbags 42 covering another portion of the door opening 32, 34, e.g., approximately the other halves of the door openings 32, 34. The flexible panel 38 in the deployed position may extend across at least half of an area circumscribed by the corresponding door opening 32, 34, as shown in FIGS. 4 and 5.

The tracks 54, 56 may extend downwardly from the flexible panel 38 along the door openings 32, 34. The flexible panel 38 in the undeployed position may be positioned at a top of the door opening 32, 34, adjacent the top ends 58 of the tracks 54, 56. The tracks 54, 56 may extend from the top ends 58 at the flexible panel 38 in the deployed position, along the pillars 46, 48, 50, to the bottom ends 60.

The flexible panels 38 are deployable along the tracks 54, 56 by the pyrotechnic actuators 70 moving from the first position to the second position. The pyrotechnic actuators 70 are each attached to one of the flexible panels 38. As the pyrotechnic actuators 70 discharge and move from the first position to the second position, the pyrotechnic actuators 70 pull the flexible panel 38 from the undeployed position to the deployed position. One end of each flexible panel 38 may be attached to the corresponding roof rail 52, and the other end of each flexible panel 38 is attached to one pyrotechnic actuator 70 in the corresponding first track 54 and one pyrotechnic actuator 70 in the corresponding second track 56. As the pyrotechnic actuators 70 move from the first position to the second position, each flexible panel 38 unfolds or unrolls between the roof rail 52 and the second position of the pyrotechnic actuators 70.

The uninflatable panel 72 may be, e.g., a fabric or net. The uninflatable panel 72 does not include a chamber inflatable by inflation medium. In other words, the uninflatable panel 72 is separated from any inflation chamber of the flexible panel 38. For example, in examples in which the flexible panel 38 includes the side curtain airbag 42, uninflatable panel 72 is separated from the inflation chamber of the side curtain airbag.

Figure 7:
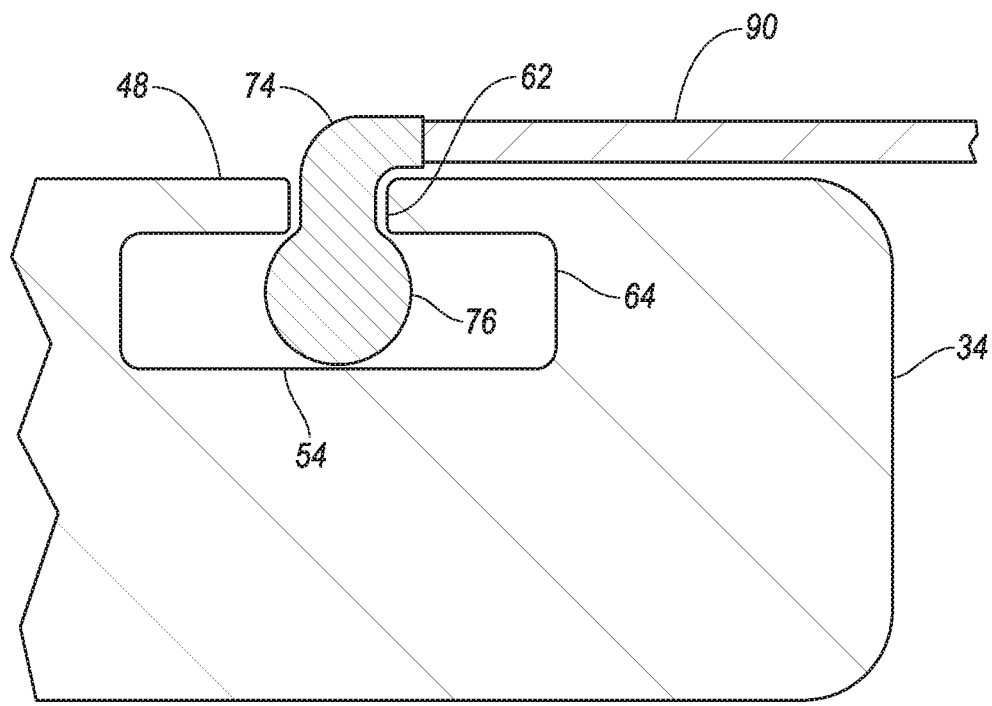
FIG. 7 is a cross-sectional view of the track of the door opening of the vehicle of FIG. 2 including a pin.

The uninflatable panel 72 includes a plurality of threads 88, 90 that are woven together. The threads 88, 90 may include vertical threads 88 and horizontal threads 90. With reference to FIG. 7, ends of at least some of the threads 88, 90, e.g., all or a subset of the horizontal threads 90, may be slidably attached to the tracks 54, 56. For example, the ends of each attached horizontal thread 90 may be slidably attached to the corresponding first and second tracks 54, 56, respectively. Pins 74 may be attached to the subset of horizontal threads 90 at the ends. Each pin 74 may be disposed in one of the tracks 54, 56. The pins 74 each have a sliding portion 76 that is wider than the opening 62 disposed in the corresponding passageway 64. As the uninflatable panel 72 moves across the corresponding door opening 32, 34, the sliding portions 76 of the pins 74 slide in the passageways 64 of the corresponding tracks 54, 56.

In examples that include the side curtain airbag 42, e.g., FIGS. 4 and 6, the side curtain airbag 42 is inflatable from an uninflated position to an inflated position. In other words, the side curtain airbag 42 includes an inflation chamber that is filled with inflation medium to inflate the side curtain airbag 42 from the uninflated position to the inflated position. In the uninflated position, the side curtain airbag 42 may be folded or rolled up, e.g., in the door opening 32, 34 at the roof rail 52, as shown in FIG. 2. In the inflated position, the side curtain airbag 42 may extend across an upper half of the corresponding door opening 32, 34. For example, the side curtain airbag 42 may cover at least 90% of the area circumscribed by the door opening 32, 34 and above a beltline of the vehicle 30.

In examples that include the side curtain airbag 42, the side curtain airbag 42 is above the uninflatable panel 72. Specifically, when the flexible panel 38 is deployed during a vehicle impact, the side curtain airbag 42 is positioned to extend across a window opening of the removable door 36 when the removable door 36 is in the door opening 32, 34, and the uninflatable panel 72 is positioned to extend across a portion of the door opening 32, 34 otherwise occupied by the removable door 36 when the removable door is in the door opening 32, 34. The side curtain airbag 42 may be fixed to the uninflatable panel 72.

The side curtain airbag 42 may be formed of any suitable airbag material, for example, a woven polymer. For example, the side curtain airbag 42 may be formed of woven nylon yarn, for example, nylon 6-6. Other suitable examples include polyether ether ketone (PEEK), polyetherketoneketone (PEKK), polyester, or any other suitable polymer. The woven polymer may include a coating, such as silicone, neoprene, urethane, and so on. For example, the coating may be polyorgano siloxane.

Figure 8:
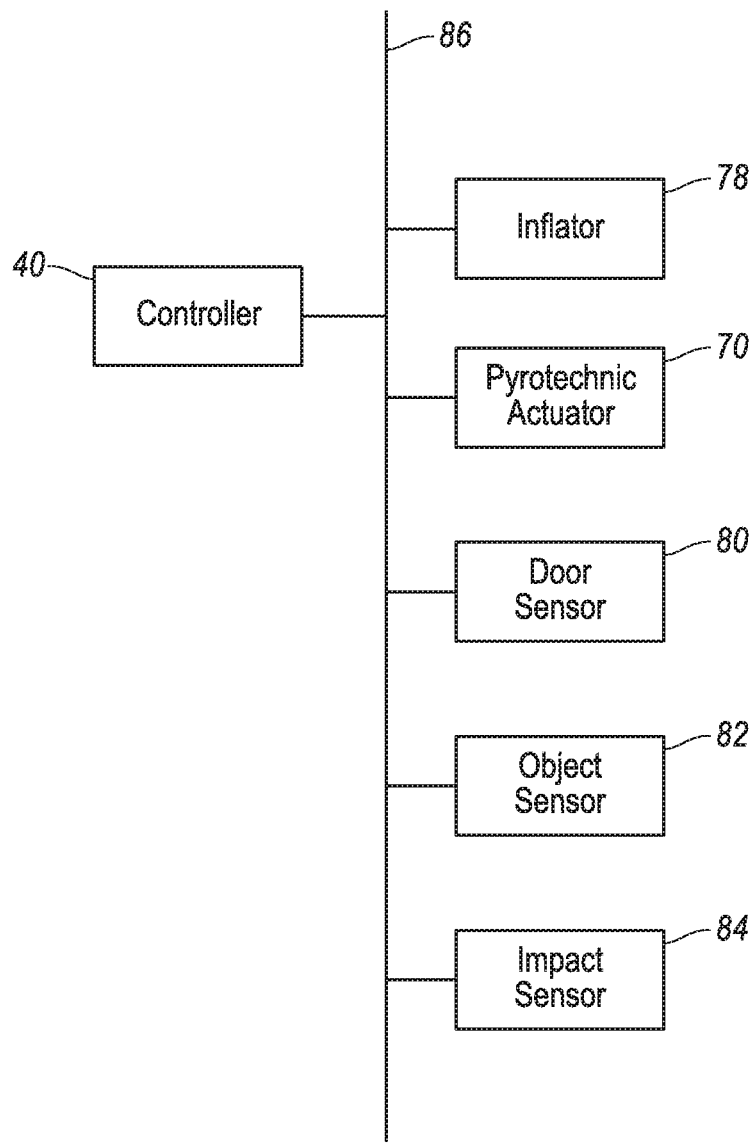
FIG. 8 is a block diagram of a control system of the vehicle of FIG. 2.

With reference to FIG. 8, an inflator 78 may be connected to each side curtain airbag 42. Upon receiving a signal from, e.g., the controller 40, the inflators 78 may inflate the side curtain airbags 42 with an inflatable medium, such as a gas. The inflators 78 may be, for example, pyrotechnic inflators that use a chemical reaction to drive inflation medium to the side curtain airbags 42. The inflators 78 may be of any suitable type, for example, cold-gas inflators. The inflators 78 may be disposed in, e.g., the roof rails 52.

With reference to FIG. 4, each flexible panel 38 may include both the uninflatable panel 72 and the side curtain airbag 42. The uninflatable panel 72 may be attached, e.g., stitched, to the side curtain airbag 42. For example, when the flexible panel 38 is in the deployed position, the side curtain airbag 42 may cover at least 90% of the area circumscribed by the door opening 32, 34 and above the beltline of the vehicle 30, and the uninflatable panel 72 may cover at least 90% of the area circumscribed by the door opening 32, 34 and below the beltline of the vehicle 30.

Alternatively, with reference to FIG. 5, the flexible panel 38 may include the uninflatable panel 72 and no side curtain airbag 42. The uninflatable panel 72 may cover at least 90% of the area circumscribed by the door opening 32, 34. In this alternative, the vehicle 30 may lack side curtain airbags 42, or the controller 40 may be programmed to prevent the side curtain airbags 42 from deploying if the uninflatable panel 72 is deployed.

Further alternatively, with reference to FIG. 6, the flexible panel 38 may include the uninflatable panel 72 and no side curtain airbag 42, and the vehicle 30 may include side curtain airbags 42 separate from the flexible panels 38. The uninflatable panel 72 may cover at least 90% of the area circumscribed by the door opening 32, 34 and below the beltline of the vehicle 30. Each side curtain airbag 42 may extend across both the front-row door opening 32 and the second-row door opening 34 for each side of the vehicle 30. The side curtain airbags 42 may cover at least 90% of the area circumscribed by the door opening 32, 34 and above the beltline of the vehicle 30.

With reference to FIG. 8, a door sensor 80 is configured to detect the presence of each removable door 36 in the corresponding door opening 32, 34. For example, the door sensor 80 may be a button positioned where the removable door 36, if present, will press the button. The door sensor 80 may be placed, e.g., near a hinge of the removable door 36 so that the removable door 36 presses the door sensor 80 regardless of whether the removable door 36 is open or closed, or the door sensor 80 may register the removable door 36 as present only when closed and as absent either when removed or when open. For another example, the door sensor 80 may be a sensor, e.g., a voltmeter, ammeter, ohmmeter, etc., that registers a value of an electrical variable, e.g., voltage, current, resistance, etc., in an electrical circuit that includes circuit elements in the removable door 36. Values of the electrical variable corresponding to an open circuit may be classified as the removable door 36 being absent, and values of the electrical variable corresponding to a closed circuit may be classified as the removable door 36 being present.

An object sensor 82 may be positioned to detect the presence of an object between two points on each door opening 32, 34. For example, the object sensor 82 may be positioned to detect an object, such as a limb of an occupant, in the door opening 32, 34 approximately along the beltline of the vehicle 30. The object sensor 82 may be any suitable type for detecting an object without contacting the object, e.g., a photoelectric sensor such as a retroreflective sensor including an emitter and a reflector at the two points; an infrared sensor; an ultrasonic sensor; a laser sensor; etc.

An impact sensor 84 is adapted to detect an impact to the vehicle 30. The impact sensor 84 may be of any suitable type, for example, post-contact sensors such as linear or angular accelerometers, gyroscopes, pressure sensors, and contact switches; and pre-impact sensors such as radar, lidar, and vision-sensing systems. The vision systems may include one or more cameras, CCD image sensors, CMOS image sensors, etc. The impact sensor 84 may be located at numerous points in or on the vehicle 30.

The controller 40 is a microprocessor-based controller. The controller 40 includes a processor, memory, etc. The memory of the controller 40 includes memory for storing instructions executable by the processor as well as for electronically storing data and/or databases.

The controller 40 may transmit and receive data through a communications network 86 such as a controller area network (CAN) bus, Ethernet, WiFi, Local Interconnect Network (LIN), onboard diagnostics connector (OBD-II), and/or by any other wired or wireless communications network. The controller 40 may be communicatively coupled to the inflators 78, the pyrotechnic actuators 70, the door sensors 80, the object sensors 82, the impact sensor 84, and other components via the communications network 86.

Figure 9:
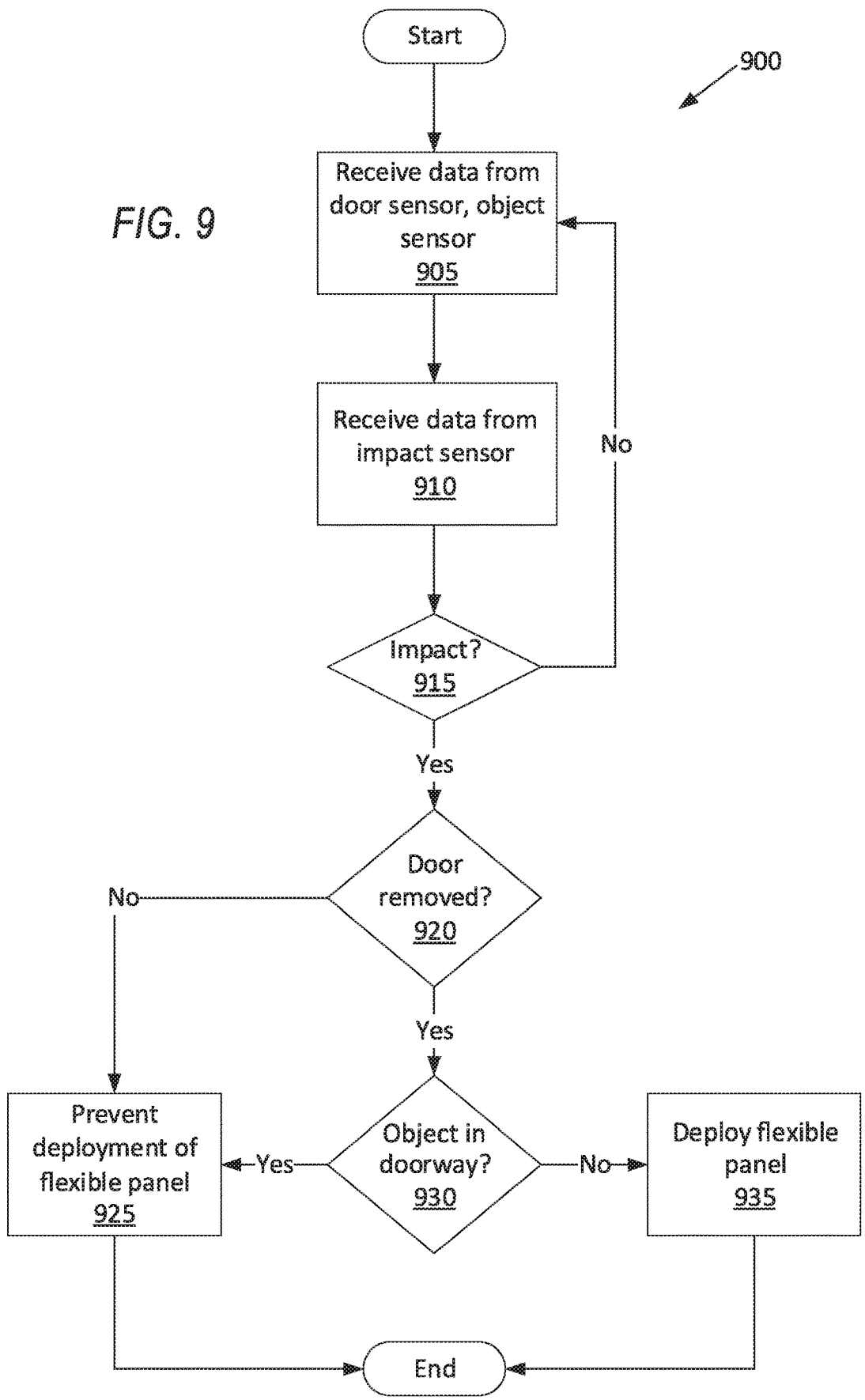
FIG. 9 is a process flow diagram of an example process of operating the flexible panel.

FIG. 9 is a process flow diagram illustrating an exemplary process 900 for operating the flexible panel 38. In general, the controller 40 is programmed to deploy the flexible panel 38 in response to an impact based on an absence of the removable door from the door opening. For the purposes of this disclosure, "based on" means that the condition is required; i.e., "A occurs based on B" means that A only occurs when B occurs. For example, the controller 40 is programmed to deploy the flexible panel 38 in response to an impact when the removable door 36 is removed and there is no object obstructing the deployment, and to prevent deployment in response to an impact when the door 36 is present or there is an object obstructing the deployment. The process 900 may be individually run for each door opening 32, 34, and the components referenced below correspond to that door opening 32, 34. The memory of the controller 40 stores executable instructions for performing the steps of the process 900.

The process 900 begins in a block 905, in which the controller 40 receives data from the door sensor 80 and the object sensor 82. The data from the door sensor 80 may be a binary value indicating the presence of the removable door 36, e.g., 0 if the door 36 is absent and 1 if the door 36 is present. Alternatively, the data from the removable door 36 sensor may be a numerical value of, e.g., the electrical variable, which the controller 40 interprets as meaning the removable door 36 is present or absent depending on whether the numerical value is above or below an electrical threshold. The electrical threshold may be chosen to be between the values of the electrical variable when the removable door 36 is absent versus when the removable door 36 is present. The data from the object sensor 82 may be a binary value indicating the presence of an object between the two points, e.g., 0 if no object is present and 1 if an object is present.

Next, in a block 910, the controller 40 receives data from the impact sensor 84. The data from the impact sensor 84 indicates if something has impacted the vehicle 30.

Next, in a decision block 915, the controller 40 determines from the data from the impact sensor 84 whether an impact to the vehicle 30 has occurred. If no impact has occurred, the process 900 returns to the block 905 to continue monitoring data from the door sensor 80, object sensor 82, and impact sensor 84.

In response to an impact, next, in a decision block 920, the controller 40 determines from the data from the door sensor 80 whether the removable door 36 is present or absent from the door opening 32, 34. If the removable door 36 is absent from the door opening 32, 34, the process 900 proceeds to a decision block 930.

If the removable door 36 is present in the door opening 32, 34, next, in a block 925, the controller 40 prevents the deployment of the flexible panel 38. If the vehicle 30 includes the side curtain airbag 42 separate from the flexible panel 38, the controller 40 instructs the inflator 78 to inflate the side curtain airbag 42. After the block 925, the process 900 ends.

After the decision block 920, if the removable door 36 is absent from the door opening 32, 34, in a decision block 930, the controller 40 determines from the data from the object sensor 82 whether an object such as a limb is between the two points on the door opening 32, 34. If an object is detected, the process 900 proceeds to the block 925 to prevent deployment of the flexible panel 38.

If no object is detected, next, in a block 935, the controller 40 instructs the pyrotechnic actuators 70 to deploy the flexible panel 38. The pyrotechnic actuators 70 discharge and move from the first position to the second position, thereby moving the flexible panel 38 from the undeployed position to the deployed position. The flexible panels 38 may prevent occupants from exiting the vehicle 30 during the impact, which may reduce injury to the occupant. If the vehicle 30 includes the side curtain airbag 42, the controller 40 instructs the inflators 78 to inflate the side curtain airbag 42, either simultaneously or after a preset delay timed to ensure that inflation of the side curtain airbag 42 does not interfere with deployment of the flexible panel 38. After the block 935, the process 900 ends.

The disclosure has been described in an illustrative manner, and it is to be understood that the terminology which has been used is intended to be in the nature of words of description rather than of limitation. Use of "in response to" and "upon determining" indicates a causal relationship, not merely a temporal relationship. Many modifications and variations of the present disclosure are possible in light of the above teachings, and the disclosure may be practiced otherwise than as specifically described.

What is claimed is:

1. A vehicle comprising:
   a door opening designed to receive a removable door;
   a flexible panel deployable to a position extending across the door opening; and
   a controller programmed to deploy the flexible panel in response to an impact based on an absence of the removable door from the door opening, and to prevent deployment of the flexible panel in response to an impact based on a presence of the removable door in the door opening.

2. The vehicle of claim 1, wherein the flexible panel is deployable to extend across at least half an area circumscribed by the door opening.

3. The vehicle of claim 1, wherein the flexible panel includes an uninflatable panel.

4. The vehicle of claim 1, wherein the flexible panel includes a side curtain airbag.

5. The vehicle of claim 4, wherein the flexible panel includes an uninflatable panel attached to the side curtain airbag.

6. The vehicle of claim 1, further comprising a track elongated along the door opening, wherein the flexible panel is deployable along the track.

7. The vehicle of claim 6, further comprising a pyrotechnic actuator attached to the flexible panel, disposed in the track, and communicatively coupled to the controller.

8. The vehicle of claim 7, wherein the pyrotechnic actuator is disposed at a first position in the track and is movable to a second position in the track upon discharging, and the flexible panel is deployable by the pyrotechnic actuator moving from the first position to the second position.

9. The vehicle of claim 8, wherein the track is narrower at the second position of the pyrotechnic actuator than at the first position of the pyrotechnic actuator.

10. The vehicle of claim 6, wherein the track is a first track, the vehicle further comprising a second track elongated along the door opening and spaced from the first track, wherein the flexible panel is deployable along the second track.

11. The vehicle of claim 10, further comprising two pillars on opposing sides of the door opening, wherein the first track is elongated along one of the pillars, and the second track is elongated along the other of the pillars.

12. The vehicle of claim 6, further comprising a B pillar elongated along the door opening, wherein the track is disposed on the B pillar.

13. The vehicle of claim 6, wherein the flexible panel includes an uninflatable panel, the uninflatable panel includes a plurality of threads, and ends of at least some of the threads are slidably attached to the track.

14. The vehicle as set forth in claim 6, wherein the track extends downwardly from the flexible panel along the door opening.

15. The vehicle of claim 1, further comprising a door sensor configured to detect the presence of the door in the door opening and communicatively coupled to the controller.

16. The vehicle of claim 1, further comprising an object sensor positioned to detect the presence of an object between two points on the door opening and communicatively coupled to the controller, wherein the controller is further programmed to prevent deployment of the flexible panel in response to the object sensor detecting an object.

17. A vehicle comprising:
   a door opening designed to receive a removable door and including hinges to which the removable door is reattachable;
   a flexible panel deployable to a position extending across the door opening; and
   a controller programmed to deploy the flexible panel in response to an impact based on an absence of the removable door from the door opening.

* * * * *